Patented Apr. 23, 1929.

1,709,853

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

CATALYTIC OXIDATION OF ORGANIC COMPOUNDS.

No Drawing.   Application filed June 3, 1927.   Serial No. 196,393.

This invention relates to the catalytic oxidation of organic compounds, particularly in the vapor phase.

Organic compounds can be oxidized in the vapor phase in the presence of catalysts, particularly catalysts containing various elements of the third, fourth, fifth, sixth, seventh and eighth groups of the periodic system. In many organic oxidations, the product desired is an intermediate oxidation product and one of the main difficulties in carrying out these catalytic oxidations is to cause the reaction to stop at the desired intermediate compound and prevent losses due to overoxidation, which, in some cases, goes all the way to total combustion. Even in certain oxidations in which mixtures are partly oxidized to remove certain components, for example, by total combustion, it is desirable to limit the effect of the catalysts to certain ingredients of the mixture treated. The effective catalytic control in these organic oxidations is, therefore, an important factor and has for the most part been achieved only imperfectly in the past and frequently at the expense of a serious loss of out-put as it is usually more difficult to control the action of a catalyst when it is heavily loaded than when it is lightly loaded.

The control is also rendered difficult by the fact that most of the reactions are strongly exothermic, and reaction speeds vary greatly with the temperature. There is, therefore, a very serious tendency for the reaction to get out of control and the cooling problem is a serious one. The high heat evolved also tends to destroy the desirable physical characteristics of the catalysts used by recrystallization, surface sintering and the like.

According to the present invention, catalysts or contact masses containing catalytic elements, whether diluted with carrier particles or undiluted, are associated with stabilizers, which prevent to a large extent undesired side reactions and permit a catalytic control which allows excellent yields and high outputs. The stabilizers used in the present invention are not to be considered as themselves catalysts. In fact, they are characterized by the fact that they contain basic radicals which in their basicity, valence or stability of their oxides at high temperatures toward oxidizing agents are radically different from the characteristics of the catalytic elements. The stabilizing elements which are usually present in the form of salts or other compounds are the alkali metals, the alkaline earth metals, some earth metals and other metals which form oxides which are not reducible by hydrogen, all of which elements will be referred to in the present invention as stabilizer forming metals. The salts or other compounds of these stabilizing elements produce a very desirable stabilizing effect, and practically any of the salts can be used which do not contain acid radicals having a deleterious effect upon the particular reaction in which the catalyst is to be utilized. Thus, for example, the acid or neutral sulfates, phosphates, halides, chlorates, nitrates, cyanides, both simple and complex, arsenates, antimonates, bismuthates, borates, carbonates and the like give excellent results.

The stabilizers can be added to the catalysts or contact masses containing the catalysts in a chemically preformed state or they may be produced by chemical reaction in the presence of the other components of the contact mass. Thus, for example, a stabilized vanadium pentoxide catalyst may be produced by adding potassium bisulfate in suitable amounts to vanadium oxide in any suitable manner, or a potassium vanadate catalyst can be caused to react with vapors containing sulfur trioxide or sulfur dioxide and air, or with dilute sulfuric acid, producing the vanadium oxide and potassium bisulfate in situ. In both cases, the potassium bisulfate will act as a stabilizer, but the action will not be the same as the physical arrangement of the molecules, and perhaps to a certain extent the chemical combination is different with different methods of producing a contact mass having the same empirical chemical composition, and the catalytic activity depends not only on the empirical chemical composition, but also on the physical arrangement and on the method of formation of the contact mass. Stabilizers can, of course, also be generated in situ by reaction of various acid bodies with stabilizer forming metal compounds of components other than the catalyst component of the contact masses.

The stabilizers can be introduced or formed in situ in any desired manner, and in the case of diluted catalysts may be incorporated into the ready formed diluted catalyst, or into a diluent or any of the catalysts or catalyst forming components before actual formation of the contact mass.

Another method of producing stabilized catalysts consists in incorporating catalytic components in carriers which themselves contain stabilizers or which contain compounds capable of forming stabilizers by subsequent treatment.

In some catalytic oxidations, the presence of free alkali is undesirable and in such cases, any free alkali present can be neutralized by treatment with acid gases, as described in my Patent No. 1,678,626 dated July 24, 1928. This treatment transforms any alkali present into the corresponding alkali forming metal salts, which act as stabilizers.

Any other suitable method of incorporating compounds of the stabilizer forming metals with catalysts or in contact masses may be used and are included in the present invention.

Diluting catalysts with finely divided or highly porous diluents is frequently desirable, and such diluted catalysts may be associated with stabilizers or stabilizers may be formed therein. It is not definitely known whether diluents of desirable physical structure have any influence on the effect of the stabilizers or not, since any effect of the stabilizer is probably masked by corresponding effects on the catalyst. Thus, diluents of high porosity or capillarity greatly increase the effectiveness of almost any catalyst and naturally, of course, increase the efficiency of any corresponding stabilized catalyst, but whether this added effectiveness is to be attributed partly to effects on the stabilizer or wholly to effects on the catalyst, is difficult or impossible to prove and the present invention is not limited to any theories of action of diluents.

The amount and nature of the stabilizer to be added depends, of course, on the reacting materials and also in some cases on the reaction product desired. Thus, for example, in the oxidation of naphthalene, a catalyst can be stabilized to produce high yields of phthalic anhydride with a given amount of stabilizer and by the addition of a still larger amount may be made an excellent catalyst for the production of alphanaphthoquinone. The nature of the stabilizer added will also vary with the different reactions. Thus, in certain oxidations, such as that of naphthalene to phthalic anhydride, stabilizers containing sodium compounds are relatively poor, whereas stabilizers containing potassium compounds or alkali metals of higher atomic weight give excellent results. The particular stabilizer to be used will, therefore, vary with the reaction and with the nature of the catalyst and it should be clearly understood that while all of the elements enumerated possess stabilizing properties when used in the proper combinations, they are not all equally effective for every reaction.

It is not definitely known just how the stabilizer acts. I am of the opinion, however, that in many, if not most, catalytic oxidations of organic compounds the most important effect is to reduce its activity in total combustion. In the case of some vanadium oxide catalysts, the color shows that when sufficient stabilizers of suitable type are added, all of the vanadium is not continuously regenerated to vanadium pentoxide, as the catalyst shows various colors of blue, green and gray and does not remain yellow as is the case with an unstabilized vanadium oxide catalyst. Whether, however, this is the only effect of a stabilizer and whether this effect is true with all catalytic elements, is not definitely determined and the present invention is not limited to any theory of action and it may well be that the stabilizer has other actions. It should be noted, however, that while in many cases the stabilizer appears to reduce the oxidation catalytic activity of the catalyst, it does not reduce the efficiency of the catalyst, but on the contrary, greatly increases the overall efficiency, that is to say, the output of the desired intermediate oxidation products per unit of catalyst per unit of time, and it may be that certain activities of the catalyst are actually enhanced and in fact this appears likely, because as has been stated above, all stabilizing elements are not equally effective in their reaction and it may well be that certain stabilizers actually enhance the catalytic power of the catalyst for producing certain intermediate compounds. While it is an advantage of the present invention that in many cases increased outputs are obtained with stabilized catalysts, the invention is in no sense limited to catalysts or processes in which the actual output is increased. In some cases, where extreme purity is desired, this can be obtained with a stabilized catalyst by reducing the loading and the advantages of the present invention can be enjoyed even though the properties of the catalysts of the present invention are not utilized all in one direction, namely, increasing the output. As in all catalytic reactions there is a certain compromise between purity of product and output, and the best compromise to be chosen in every case will be determined by the skilled catalytic chemist.

In reactions, in which a mixture of components are subjected to selective oxidation in order to remove one or more components, usually by total combustion, the same problems are met and while it is frequently possible to completely remove one or more components by total combustion, this is often done at the expense of certain percentage of loss through total combustion of other components which are desired in an undecomposed state. Stabilized catalysts of the present invention permit a very accurate control of catalysts and particularly total combustion catalysts used in such reactions. It is thus possible to obtain purer products with better yields.

Stabilized catalysts when used in oxidation reactions according to the present invention bring about remarkably improved results, and in many cases a stabilizer alone is sufficient.

I have found, however, that the addition of other chemical compounds possessing catalytic activity, but not being specific catalysts for the particular reaction, appears to enhance the effect of the stabilizer and to tune it for more perfect results for the individual reactions. These compounds will be referred to as stabilizer promoters without thereby limiting the invention to any particular theory of action as it may be that the stabilizer promoters do not act directly on the stabilizer itself. Among the stabilizer promoters are the usual catalytic compounds containing the usual catalytic elements and particularly heavy metals and some amphoteric metals, such as aluminum, zinc, lead and the like. In general, of course, any catalytic element which is not a specific catalyst for the reaction in question may, when combined with a stabilized catalyst for that reaction, act as a stabilized promoter. Among the most effective stabilizer promoters are, however, some of the catalytic elements which are by themselves relatively mild catalysts and the effect of the stabilizer promoter is not a pure additive one based on the catalytic power of the elements present in the stabilizer promoter. On the contrary, the results tend to indicate that there is a definite cooperation between the stabilizer promoter and the stabilizer catalysts and in some cases, the addition of stabilizer promoters produces results greatly in excess of those which would be predicted from the known catalytic power of the promoter elements themselves.

Stabilizer promoters may be added in a chemically preformed state or formed in situ, as has been described in the case of stabilizers, and the forms of introduction may take place in any suitable manner, as will be apparent to the skilled chemist. It is, however, by no means necessary that the stabilizer promoters should be present as separate chemical compounds and on the contrary, many very effective catalysts may be produced by the addition of compounds of the stabilizing forming metals with various stabilizer promoter elements. Thus, for example, the various alkali metal metallates form excellent composite stabilizers and stabilizer promoters. It is possible, of course, that during reaction these compounds break up to a certain extent, and perhaps even in such cases the stabilizer becomes completely dissociated from the stabilizer promoter. It is impossible, however, to determine just what takes place within the catalyst during catalysis, and I do not wish to limit my invention to any theory.

In addition to stabilizers and stabilizer promoters, which are present or are introduced as individual chemical compounds or combined chemically with each other, the stabilizer promoters may be present in chemical combination with various diluents. Thus, for example, many heavy or other metal silicates form at the same time excellent diluents and stabilizer promoters. Notable examples of these compounds are various zeolites in which heavy metal or other elements are present in exchangeable or non-exchangeable form. These zeolites, and, in fact, base exchanging bodies generally, whether zeolites or non-siliceous base exchange bodies, possess for the most part a microporous structure which is excellently suited as a catalyst diluent or as a framework in or on which catalytically active elements may be hung. Such base exchange bodies permit in some cases also a chemical combination between the stabilizer, stabilizer promoter and the catalyst itself. Thus, for example, a zeolite or other base exchange body may contain a catalytically active element and also a heavy metal or an amphoteric metal oxide associated with stabilizers. Such catalysts are among the most effective for the oxidation of organic compounds and are of course included as one of the important classes of the present invention. The formation of these zeolites or other base exchange bodies, whether containing catalytically active elements in chemical combination or not, is described in the co-pending applications of myself and Johann A. Bertsch, Serial No. 100,116, filed April 6, 1926, and Serial No. 95,771, filed March 18, 1926 and Patent No. 1,701,075 dated Feb. 5, 1929, and in my co-pending application, Serial No. 142,783, filed October 19, 1926, and Patent No. 1,694,620, dated Dec. 11, 1928, and any of the methods of formation therein set forth may be used to produce base exchange bodies containing stabilizers or stabilizers and stabilizer promoters for use in the oxidation of organic compounds according to the present invention.

The invention is not limited, of course, to the use of any particular diluent, but diluents of high porosity and high capillarity greatly enhance the effectiveness of the contact mass used. The action of the diluents, particularly the porous diluents appears to be primarily due to their physical characteristics. Catalytically active components which are not catalysts for the particular reaction are classified under stabilizer promoters, although, of course, it is difficult in some extreme cases to draw a line between diluents and stabilizer promoters in the case of certain compounds which appear to have weak catalytic activity which may be due to their physical or to their chemical characteristics. In general, however, where components which do not possess fairly high catalytic activity, as a result of their chemical structure, they are to be classed as diluents rather than stabilizer promoters.

In its broader aspects, the present invention is directed toward any catalytic organic oxidation and examples of typical oxidations are the oxidations of benzol, toluol, phenol, tar phenols or furfural or to maleic acid and fumaric acid; cresol to salicylalaldehyde and salicylic acid; toluol and the various halogen and nitro substituted toluols to the corresponding aldehydes and acids; xylenes, pseudo-cumene, mesitylene, paracymene and other derivatives to the corresponding aldehydes and acids; naphthalene to naphthoquinone, pthalic anhydride and maleic acid; phthalic anhydride to maleic acid and fumaric acid; anthracene to anthraquinone; phenanthrene to phenanthraquinone and diphenic acid; acenaphthene to acenaphthylene, acenaphthoquinone, bisacenaphthylidenedione, naphthaldehydic acid, naphthalic anhydride and hemimellitic acid; fluorene to fluorenone; eugenol and isoeugenol to vanillin and vanillic acid; methyl alcohol and methane to formaldehyde; ethyl alcohol to acetic acid; ethylene chlorhydrine to chloracetic acid, and the like. Stabilized catalysts of the present invention may also be used in the catalytic purification of anthracene, coal tar ammonia and the like. The above enumerated typical oxidations, of course, do not in any sense limit the scope of the invention, and are merely typical illustrative examples of the type of reaction in which the principles of the present invention can be effectively utilized. The invention will be described in greater detail in connection with the following specific examples, which, however, do not limit the invention to the exact details therein set forth, although in its more specific aspects the particular features of the examples are included.

*Example 1.*

15 parts of silver vanadate are dissolved up in 25% ammonia water to form a complex salt, which is then mixed with 60 parts of kieselguhr, glaucosil, or colloidal silica until a homogeneous mass results, which is then dried at temperatures from 80–100° C., until the evolution of ammonia has completely ceased. The mass thus obtained is then impregnated with 25 parts of potassium sulfate or 39 parts of potassium bisulfate in the form of a 20% aqueous solution. The mass may then advantageously be formed into granules by means of a press or of any other suitable means, and after formation, the granules are preferably dried at 80–100° C., producing a vanadate catalyst stabilized with potassium sulfate or bisulfate. This catalyst is well suited for the oxidation of methyl alcohol to formaldehyde, benzol, toluol, phenol, tar acids or phthalic anhydride to maleic acid, the vapors of the compounds mixed with the air in the proportion of about 1:25 by weight and being passed over the contact mass at a temperature of 360–420° C.

Instead of diluting with kieselguhr, the ammoniacal silver vanadate is mixed with a potassium sulfate solution and then sprayed onto 200 volumes of heated pumice fragments, quartz fragments, aluminum granules or granules of ferro-silicon, ferro-molybdenum, silico-ferro-manganese, ferrochrome, ferro-vanadium or the like. The resulting contact masses are well suited for the oxidation of anthracene to anthraquinone or acenaphthene and acenaphthylene to naphthalic anhydride. The hydrocarbon vapors mixed with air in the proportion of 1:40 by weight being passed over the contact mass at 330–380° C.

*Example 2.*

80 parts of kieselguhr or other finely divided material rich in silica are uniformly and homogeneously impregnated with 20% of aqueous solution of cæsium carbonate containing 22 parts. The mixture is then formed into granules, and calcined at temperatures up to 400° C. The dried granules are then sprayed at an elevated temperature with 9 parts of a concentrated ammonium vanadate solution, the granules being constantly turned over so that the water of the ammonium vanadate solution is evaporated as soon as it strikes the granules and therefore does not soften them. The treated material is then exposed to a dilute stream of gaseous hydrochloric acid until no more acid is absorbed. Instead of using hydrochloric acid, chlorine may be used.

A contact mass is thus obtained which contains cæsium chloride as a stabilizer and is well suited for the catalytic oxidation of many organic compounds, particularly of naphthalene to alphanaphthoquinone when vapors of the former mixed with air in the proportion of 1:60 are passed over the contact mass at temperatures from 370 to 400° C. By reducing the proportion of naphthalene to air from 1:60 to 1:15 phthalic anhydride is obtained as the main product.

*Example 3.*

200 parts by volume of pea-size pumice fragments are impregnated with a concentrated solution containing 25 parts by weight of acid potassium phospho-vanadate. The contact mass is then dried at temperatures below red heat and calcined and is a good catalyst for the oxidation of toluol, chlor toluols, nitro toluols, chlor-nitro toluols and brom-nitro toluols to the corresponding aromatic aldehydes and acids. Preferably, vapors of the compounds should be mixed with a great excess of air and should be passed over the contact mass at 330–420° C.

*Example 4.*

60 parts of kieselguhr are uniformly impregnated with a solution of 10 parts of $V_2O_5$ and 15 parts of KOH in 60–70 parts of water. The impregnated material therefore contains potassium vanadate and excess KOH, and is formed into granules and treated with a mixture of air and chlorine until completely saturated with the latter. Thereupon, the temperature is gradually raised, some chlorine being still passed over if necessary, mixed also with air and steam. The contact mass thus obtained catalyzes the oxidation of toluols and substituted toluols, xylenes, pseudocumenes, mesitylene, paracymene and other substitution products to the corresponding aldehydes and acids under the conditions described above.

*Example 5.*

200 volumes of pulverized quartz are thoroughly mixed with 28 parts of nickel molybdate and then uniformly impregnated with a solution of 20 parts of calcium chloride in 70–80 parts of water. The moistened material is then formed into granules, dried at temperatures below red heat and calcined. Frequently, it is desirable to subject the contact mass thus obtained to a subsequent treatment with chlorine or with gases containing hydrochloric acid. The contact mass thus produced can be used for the catalytic oxidation of phenanthrene to phenanthraquinone when vapors of the hydrocarbon mixed with air or other oxygen containing gas in the proportion of 1:15 by weight are passed over the contact mass at 370–450° C.

*Example 6.*

60 parts of kieselguhr are mixed with a solution containing 12 parts of potassium vanado-molybdate in 60 parts of water and mixed with a suspension containing 6 parts of ferric pyrovanadate in suspension. 8 parts of KOH in 25 parts of water are then added and the mass produced is formed into granules, dried, calcined at 400° C., and then subjected to a subsequent treatment of burner gases at 400–500° C., until all the alkali is transformed into the sulfate or bisulfate. The contact mass is then blown with air until acid gases no longer escape, and is then suited as a contact mass for the catalytic oxidation of fluorene to fluorenone, acenaphthene to naphthalic anhydride or anthracene to anthraquinone under the reaction conditions described in the foregoing examples.

*Example 7.*

30 parts of kieselguhr are mixed with 40 parts of colloidal silicic acid and then impregnated with 20 parts of potassium molybdate, 3 parts of sodium tungstate, 2 parts of lithium tantalate and 30 parts of 33° Bé. potassium waterglass. The moist mass is pressed into granules, calcined and then given a subsequent short treatment with gases containing $SO_3$ and chlorine. This contact mass is suited for the catalytic oxidation of chlortoluol to chlorbenzaldehyde. Instead of using gases containing $SO_3$ and chlorine, gases containing oxides of nitrogen may be used until no further absorption takes place. A still further tuning of the catalyst may also be effected by the addition of 3:4 parts of potassium phosphate.

*Example 8.*

50 parts of colloidal silicic acid and 60 parts of comminuted pumice are thoroughly mixed and treated with 25 parts of freshly precipitated ferric vanadate, 5 parts of potassium sulfate, 2 parts of potassium chlorate, 2 parts of lithium carbonate and one part of potassium cyanide dissolved or suspended in 80 parts of water. The ferric vanadate may advantageously contain 10 percent excess of ferric oxide. The mass is formed into granules, dried and calcined at a temperature of 400° C., and forms a catalyst which can be effectively used for the catalytic oxidation of anthracene to anthraquinone and acenaphthene to naphthalic anhydride when the vapors of either hydrocarbon mixed with a great excess of air are passed over the contact mass at 330–400° C.

After the catalyst has become spent from use it can be readily reactivated by means of oxides of nitrogen or by spraying with dilute nitric acid.

*Example 9.*

280 parts of pumice meal or comminuted asbestos fibers are treated with 2 per cent of its weight of manganese sulfate containing 2 mols of water which is introduced in the form of a 10% aqueous solution. A 10% solution of caustic alkali is then added, precipitating the manganese oxide in a finely divided condition. The impregnated pumice is then stirred into a 33° Bé. water-glass solution containing about 24 to 30 parts of $SiO_2$, the solution having been previously diluted with about 5 to 6 volumes of water. 9 parts of $V_2O_5$ are dissolved in a normal sodium hydroxide solution to form a sodium vanadate solution containing sufficient sodium hydroxide to cause the solution to react strongly alkaline to litmus. To this solution 16 parts of $Fe_2O_3$ in the form of a 10 per cent ferric sulfate solution are added to precipitate ferric vanadate mixed with ferric oxide.

18 parts of V₂O₅ are mixed with 2 per cent of their weight of concentrated sulfuric acid and then diluted with 20 parts by weight of water. The suspension is boiled quietly and SO₂ containing gases are passed in until a clear blue solution of vanadyl sulfate is formed. The blue solution is then gradually treated with 10N sodium hydroxide solution, which first precipitates out vanadyl hydroxide and then dissolves up the precipitate to form a clear coffee-brown solution of sodium vanadite. The waterglass suspension and the ferric vanadate-ferric oxide MnO₂ suspensions are poured together and the vanadite solution added with vigorous agitation. The major part of the excess alkali is neutralized with 10 per cent sulfuric acid or 5 per cent nitric acid, or a mixture of both, and the gelatinous product formed is pressed, washed two or three times with 200 parts of water and dried at temperatures below 100° C. The product is a zeolite-like sodium-vanadyl polysilicate diluted with pumice meal or asbestos fibres and containing ferric vanadate, ferric oxide and manganese oxide in a fine state of subdivision. The stabilizer in this product is present in the form of a complex compound. Fe₂O₃ and MnO₂ act as stabilizer promoters.

The contact mass described is well suited for the oxidation of anthracene and its derivatives to the corresponding anthraquinones, and of acenaphthene and chloracenaphthene to naphthalic anhydride and chlor naphthalic anhydride, the vapors of the aromatic compounds mixed with air in the proportion of 1 to 30 by weight being passed over the contact mass at 330–420° C.

Example 10.

An artificial carrier is made by impregnating 80 parts of kieselguhr or silicate rock with a concentrated solution containing 25 parts of potassium cadmiate. The mixture is then formed into granules, dried and calcined and then sprayed hot with 16 parts of ammonium vanadate dissolved in water. The contact mass produced is preferably treated at 450–500° C. with burner gases or with oxides of nitrogen. The contact mass after this treatment is suitable for many specific catalytic oxidations. Thus for example, ammonia recovered from coal tar distillation and containing small amounts of organic compounds as impurities, can be purified by passing the vapors of ammonia mixed with air in proportions of 1:10 over the above contact mass at temperatures from 400 to 460° C. Instead of cadmiate solution other metallates may be used.

Example 11.

41 parts of SiO₂ in the form of a 33° Bé. potassium waterglass solution are diluted with 200 parts of water and 70 parts of cellite are then stirred in. 18 parts of V₂O₅ are dissolved up in a concentrated potassium hydroxide solution to form a 10% potassium metavanadate solution. 5 parts of freshly precipitated aluminum oxide are treated with sufficient 5N potassium hydroxide solution to dissolve the aluminum oxide in the form of potassium aluminate. These three solutions are mixed with vigorous agitation at temperatures of from 60 to 70° C. and sufficient 10% sulfuric acid is added to cause the whole mass to solidify to a gel. The gel should react alkaline to litmus and is then sucked, thoroughly pressed and dried at temperatures under 100° C., broken into fragments and sprayed with sufficient sulfuric acid or other inorganic acids, for example, 1 part of sulfuric acid diluted with 5 parts of water until a sample in a test tube when covered with water and warmed just reacts acid to congo. A sulfuric acid salt-like body of a potassium-aluminum-vanadium zeolite is thus produced, the vanadium and aluminum being present in non-exchangeable form.

After blowing with air at 300–400° C. this catalyst is well suited for the catalytic oxidation of naphthalene to phthalic anhydride, the naphthalene vapors and air in a mixture of 1:10–15 by weight being passed over the catalyst at 370–420° C.

Example 12.

14 parts of V₂O₅ are dissolved up in 9 parts of 100% KOH to form a 30% potassium vanadate solution which is then diluted with 300 parts of water. Into this solution comminuted pumice, kieselguhr, quartz or preferably natural or artificial zeolites are stirred in, the amount of diluent being such that the product just remains readily stirrable. Usually about 100 to 150 parts of diluent will be needed. A solution containing 26 parts of silver nitrate in 100 parts of water is then caused to act on the vanadate solution, a neutral reaction to litmus being obtained after complete addition of the silver nitrate solution by means of 10% sulfuric acid. A diluted yellow silver vanadate is obtained in a finely divided state and is stirred into 140 parts of a 33° Bé. waterglass solution, whereupon a 5% vanadyl sulfate solution is added in a thin stream with vigorous agitation. The vanadyl sulfate solution is prepared by reducing 16 parts of V₂O₅ with any suitable reducing agent. A black zeolite-like body is obtained in which part of the silver is reduced to very finely divided metal. The gelatinous product is pressed, dried and broken into fragments in the usual manner and is an excellent catalyst for the catalytic oxidation of methyl alcohol or methane to formaldehyde, isoeugenol to vanillin and vanillic acid, ethyl alcohol to acetic acid and ethylene chlorhydrine to chloracetic acid under the usual reaction conditions.

Example 13.

12.2 parts of $Ta_2O_5$ in the form of potassium tantalate, 10 parts of $MoO_3$ in the form of potassium molybdate, 11.8 parts of $WO_3$ in the form of potassium tungstate are dissolved in 500 parts of water and sufficient 10% sulfuric acid is added with vigorous agitation to precipitate the acids in a finely divided form. 28 parts of $UO_3$ in the form of a 5% aqueous solution of uranyl nitrate are then added and uranium hydroxide is precipitated with potassium hydroxide. A solution of 33° Bé. potassium waterglass containing 70 to 75 parts of $SiO_2$ and diluted with 200 parts of water is then added to suspension with vigorous agitation and heated to about 75° C., the whole solidifying to a gel which on further stirring breaks up into fragments. These are then sucked as usual, thoroughly washed in water in a number of portions of about 100 parts each, or the pressed gel can be dried under 100° and water permitted to trickle over it until it breaks into fragments.

The product is a zeolite-like body containing in non-exchangeable form tantalum, molybdenum, tungsten and uranium and can be used as a catalyst for the oxidation of toluol and its derivatives to the corresponding aldehydes.

Example 14.

A natural or artificial zeolite consisting of a sodium aluminum polysilicate is treated with an aqueous solution of potassium chloride, rubidium chloride, cæsium chloride or magnesium sulfate, or mixtures, in order to remove the sodium by base exchange. The zeolite is then dried and sprayed with solutions or suspensions of the oxy metal acids of the fifth group of the periodic system of their ammonium or metal salts, such as ammonium vanadate, iron vanadate &c. The product is then calcined and if necessary, treated with mineral acid vapors or dilute mineral acids and constitute good catalysts for the catalytic purification of coal tar ammonia when the latter mixed with air is passed over the catalyst at 370–450° C.

Example 15.

20 parts of $V_2O_5$ are suspended in 500 parts of water and acidified with concentrated sulfuric acid and reduced at an elevated temperature with gases containing $SO_2$ to form the blue vanadyl sulfate. The solution is divided into two equal parts, half being treated with 5N potassium hydroxide solution at 50–60° C. until a clear, coffee-brown solution of the potassium vanadite is produced, which is then diluted with 60 parts of cellite or a mixture of 40 parts of cellite and 40 parts of finely comminuted quartz. Other diluents such as silicates of the heavy metals or silicates which contain barium, calcium or magnesium of rocks, tuff, lava, truss, etc. may be used. To this suspension the other half of the vanadyl sulfate solution is added, care being taken that after the addition is complete, the mixture still reacts alkaline or neutral to phenolphthalein. After freeing from the mother liquor the reaction product is a diluted potassium vanadyl base exchange body which can be used for the oxidation of toluol to benzaldehyde. If the alkali of the base exchange body is neutralized with dilute acids such as for example, 3 to 5% sulfuric, phosphoric or nitric acids, the neutral or acid alkali metal salt is produced and the resulting contact mass can be used for the catalytic oxidation of toluol to benzoic acid.

Example 16.

16 parts of vanadic acid in 300 parts of water are reduced to the blue vanadyl sulfate in the usual manner and the solution is divided into 2 parts in the proportion of 3 to 2. The larger portion is then transformed into a coffee-brown potassium vanadite solution to which is added a suspension of 60 to 80 parts of cellite in 140 parts of a 33° Bé. potassium waterglass solution which has been diluted with 500 parts of water. Thereafter the smaller portion of the vanaydl sulfate solution is added with vigorous agitation, the whole mass solidifying to a gray-green gel and showing a weak alkalinity to phenalphthalein. The last traces of the zeolite formed can be salted out by the addition of a saturated potassium sulfate or chloride solution. A so-called multicomponent zeolite is thus prepared and the excess alkali can be washed out to a greater or less extent. After treating with alkali the catalyst can be used for the catalytic oxidation of naphthalene air mixtures to alphanaphthoquinone or a phthalic anhydride, depending on the amount of alkali which has been washed out.

Example 17.

One mol of ammonium vanadate suspended in 300 parts of water is treated with sulfur dioxide at an elevated temperature, producing a solution of the greenish blue vanadyl salt. The excess $SO_2$ is then removed by boiling. One mol of a 10 percent solution of copper sulfate is dissolved up in sufficient 25 percent ammonia to form a deep blue cuprammonium sulfate solution. 10 mols of $SiO_2$ in the form of an ammoniacal 33° Bé. potassium or sodium waterglass solution are diluted with 10 volumes of water and sufficient cellite or pumice meal is stirred in to produce a suspension which is just stirable. The vanadyl sulfate and cuprammonium sulfate solutions are then poured into the water glass suspension heated up to about 65° C. In order to accelerate the precipitation of the gel, dilute sulfuric acid may be added cautiously until the mixture is weakly alkaline to prenolphthalein. After pressing in the usual manner the sodium ammonium vanadyl copper zeolite produced can be treated with acids and is suitable for the catalytic oxidation of anthracene to anthraquinone.

Example 18.

A blue vanadyl sulfate solution containing 16.6 parts of $V_2O_4$ is reduced electrolytically between platinum electrodes until the blue color of the solution is turned to green, 24 parts of $SiO_2$ in the form of a 33° Bé. waterglass solution are diluted with 10 volumes of water and the vanadium containing solution is stirred in with vigorous agitation until the alkalinity is between methyl orange and phenolphthalein red. A light green gelatinous mass precipitates out, which is sucked and dried and constitutes a zeolite-like body containing trivalent vanadium oxide in non-exchangeable form, and in which the stabilizing alkali is combined in a complex form. This contact mass can be used for many catalytic oxidations such as for example the oxidation of toluol and air to benzaldehyde. Considerable secondary chemical changes take place in the catalyst during catalysis, as the color undergoes considerable change.

Example 19.

An iron zeolite is prepared by fusing 15.9 parts of $Fe_2O_3$, 20–30 parts of $SiO_2$ and 40 parts of $K_2CO_3$ in an iron crucible, adding sufficient borax until the mixture sinters or becomes completely molten. The cool product broken into fragments and washed two or three times with 200 parts of water, which produces hydration, is then sprayed with a solution containing 6 to 8 parts of ammonium vanadate dissolved in hot water. After calcining and subsequent treatment with acid such as dilute sulfuric or nitric acid, this contact mass is well suited for the catalytic oxidation of anthracene to anthraquinone when anthracene vapors mixed with air in the proportion of air of 1 to 30 are passed over the contact mass at 340–380° C.

Example 20.

80 parts of kieselguhr are suspended in 300 parts of water containing 20 parts of KOH and 18 parts of $V_2O_5$. Thereupon 160 parts of 33° Bé. potassium waterglass solution diluted with 3 to 4 volumes of water is added and sufficient 10 percent solution of equal parts ferric sulphate and manganese sulfate is added until the mother liquor of the diluted reaction product is neutral or acid to congo. An iron manganese polysilicate is thus produced which contains iron manganese vanadate in finely divided state. The product is freed from the mother liquor by pressing, but is not washed, in order to prevent washing out the potassium sulfate which is present and which acts as a stabilizer. The product is dried, broken into fragments and calcined, and is a good catalyst for the oxidation of acenaphthene to naphthalic anhydride under the reaction conditions described in some of the foregoing examples.

Example 21.

100 parts of kieselguhr are impregnated with a suspension of 9 parts of vanadiumoxide, 2 parts uraniumoxide in 10% potassium hydroxide solution containing 18 parts of 100% potassium hydroxide. This so obtained moistened mass is formed into granules, dried, calcined and treated with gases containing $SO_2$—$O_2$ at 450–500° C. until heavy fumes of $SO_3$ are given off.

The finished contact mass is well adapted for use in the catalytic oxidation of ethyl alcohol to acetaldehyde and acetic acid, as well as for the catalytic oxidation of the higher homologous alcohols to the corresponding aldehydes, ketones and acids.

Example 22.

14.4 parts of $V_2O_5$ are suspended in 200 parts of water to form a slurry and then after warming to 60–70° C. are dissolved by means of 42 parts by volume of a 10N potassium hydroxide solution to form potassium vanadate. 14.8 parts of manganese sulfate with 2 mols of water are dissolved in 200 parts of water and then poured into the potassium vanadate solution with vigorous agitation, followed by warming to 40–50° C. and neutralization to litmus by means of 2N sulfuric acid. The brownish precipitate which forms is filtered and thoroughly washed with water, whereupon the wet precipitate is suspended in a solution of 10 parts of potassium bromide in 200 parts of water. The suspension thus produced is sprayed onto 400 volumes of pea-sized pumice fragments which are maintained at an elevated temperature, care being taken to coat the pumice fragments uniformly.

The stabilized catalyst thus obtained is filled into a converter and vapors of a crude anthracene press cake containing 25–35% of crude anthracene mixed with air in the proportion of 1 to 18 are passed over the catalyst at 370–400° C.

The resulting reaction product contains 70–80% of anthracene and when analyzed by the Kjeldahl method shows that the carbazole originally present is substantially completely consumed. The reaction product therefore consists mainly of anthracene and phenanthrene, the percentage of the latter being somewhat lower than in the original raw material showing that some of the phenanthrene is also consumed in the reaction but little, if, any, of the anthracene is attacked.

The 70–80% anthracene is recrystallized once from solvent naphtha and yields at once a 90–95% anthracene. A high percentage phenanthrene can be obtained by distilling off the solvent. The yields of anthracene approach the theoretical.

Similar results can be obtained by substituting the vanadates of iron, cobalt, nickel, titanium, aluminum, copper, silver, lead or others, for the manganese vanadate, and other stabilizers, such as for example, potassium nitrite, potassium nitrate, potassium chloride, potassium fluoride, potassium acid fluoride, potassium hydrogen sulfate, potassium sulfate, sodium dihydrogen phosphate, potassium hydroxide, sodium carbonate, and the like, may be used singly or in a mixture and stabilize the catalyst used for this particular reaction. The amounts of stabilizers to be used will vary somewhat with the catalyst and with the particular stabilizer. Using the same catalytic compositions and similar reaction conditions crude benzene and toluene fractions can also be purified by selective oxidation of the impurities.

*Example 23.*

36 parts of VO are suspended in 900 parts of water, 33.6 parts of 100% KOH are added and the mixture warmed to 60–70° C. with vigorous agitation, which is continued until the solution is complete. 290 parts of cellite or glaucosil are stirred in and the product made neutral to litmus with 2 mols sulfuric acid. Thereupon a solution containing 52.8 parts of ferric sulfate in 300 parts of water is added. The reaction product obtained is sucked, washed with about 1500 parts of water, dried and then pulverized. 88.8 parts of aluminum sulfate with 18 mols of water are dissolved in 600 parts of water and 450 volume parts of 2N potassium hydroxide solution is added with vigorous agitation, precipitating out aluminum hydroxide, which is filtered and then washed with about 800 parts of water. The wet aluminum hydroxide is then dissolved up in a solution containing about 50.7 parts of 100% KOH in 60 parts of water. The diluted iron vanadate is mixed with potassium aluminate solution and 125 parts of 33° Bé. potassium waterglass is added, forming a moist mass which is easily formed into fragments. The fragments are then dried cautiously at about 80° C. in a stream of carbon dioxide and air producing an aluminum zeolite in which the catalytically effective material is embedded in the form of a diluent.

The contact mass is calcined at 400° C. and is then placed in a converter. 25–35% crude anthracene is vaporized and the vapors mixed with air in the proportion of 1 to 20 by weight are passed over the catalyst at 330–350° C. The resulting reaction product contains 75–85% of anthracene together with unimportant amounts of anthraquinone, traces of carbazole and small amounts of phenanthrene. The yields based on the weight of crude anthracene are very high.

The composite reaction product can be used directly for the catalytic oxidation of anthracene to anthraquinone or by a single recrystallization from solvent naphtha can be transformed into 90–95% anthracene, which can be used for catalytic oxidation or for the chromic acid oxidation of anthracene to anthraquinone.

In the composite contact mass described, the stabilizer and stabilizer promoter form parts of the zeolite, the alkali acting as a stabilizer and the aluminum oxide acting as stabilizer promoter.

Instead of iron vanadate, other vanadates can be used singly or in mixture, for example, manganese, silver or copper vanadates. The aluminum zeolite may be replaced with other zeolite compositions which combine stabilizers and stabilizer promoters.

If this catalytic composition is given a preliminary treatment with acids, e. g., diluted $H_2SO_4$, in order to form the salt-like body of the zeolite, 25 to 35% crude anthracene in the vapor phase mixed with air in the ratio 1:20 by weight at 350 to 370° C. can easily be converted to a crude anthraquinone containing 70 to 78% anthraquinone. The yield is very good.

*Example 24.*

10 parts of molybdenum oxide are dissolved in 8.7 parts of 100% KOH dissolved with 150 parts of water and warmed to about 80° C. 7.5 parts of ferric chloride dissolved in 100 parts of water are then added and the light brown precipitate thus obtained is filtered and thoroughly washed. The wet precipitate obtained is suspended in a solution containing 7 parts of potassium sulfate in 250 parts of water and is used to impregnate 200 volumes of pea-sized pumice fragments which are then calcined.

The contact mass is filled into a converter and the vapors of 45% crude anthracene mixed with air in the proportion of 1 to 18 by weight are passed over the contact mass at 370–420° C., producing a 70–75% anthracene. The remainder of the product consists for the most part of phenanthrene which amounts to about 20%, the rest being small amounts of carbazole. By recrystallization from solvent naphtha the reaction product can be transformed into 90% anthracene. The yields are good.

Instead of iron molybdate, molybdenum oxide or other molybdates, such as silver or copper molybdates, or acids or salts of tungsten, chromium or uranium may be used. In place of the stabilizer used potassium bromide, potassium cyanide, potassium chloride, sodium sulfate or other stabilizers may be used.

*Example 25.*

18 parts of freshly precipitated ferric oxide are suspended in 150 parts of water and in this suspension 25 parts of potassium nitrate are dissolved. 200 volumes of pea-sized pumice fragments are impregnated with the suspension in the usual manner and then dried.

The stabilized contact mass thus obtained is placed in a converter and the vapors of 45-50% crude anthracene mixed with air in the proportion of 1:25 to 30 by weight are passed over the catalyst at 330-360° C. A reaction product is obtained which consists primarily of a mixture of anthracene and phenanthrene, the carbazole and oily impurities being burned out to a large extent.

In addition to the iron oxide, oxides of copper, manganese, nickel or cobalt singly or in combination, may be used with stabilizers, such as potassium sulfate, potassium nitrate or sodium nitrate.

*Example 26.*

17.5 parts of iron titanium oxide compounds, e. g., ilmenite, are suspended as a fine powder in 150 parts of water. 8 parts of KOH, 100%, are dissolved in this suspension. 200 volume parts of pumice stone of pea size are coated in the usual way with this mixture and calcined with air at 400-500° C. The stabilized catalyst obtained in this manner is suitable for the catalytic purification of crude anthracene and crude naphthalene of different grades of purity.

Vapors of 30-35% crude anthracene mixed with air at the ratio 1-18 by weight and passed over this contact mass at 360-400° C. result in a 60-70% anthracene which contains, as its main impurity, phenanthrene, and small amounts of carbazole. The chief amount of carbazole is decomposed to $CO_2$, water and nitrogen.

This reaction product, once recrystallized from the usual coal tar solvents, such as toluol, results in high grade anthracene which is directly applicable for the manufacture of anthraquinone by well known processes.

Instead of KOH as stabilizer, equivalent amounts of SrO can be used.

*Example 27.*

14 parts $CeO_2$ are suspended in a solution consisting of 150 parts of water and 10 parts of $KNO_3$.

200 volume parts of pumice or aluminum granules are coated with this suspension in the usual manner, then dried and calcined.

This stabilized contact mass is applicable for the catalytic purification of anthracene and other aromatic hydrocarbons of various grades of purity.

A mixture of vapors of crude anthracene press cake and air in the ratio 1 to 22 by weight, passed over the catalyst at 330-380° C., results in an anthracene which contains about 30% phenanthrene and small amounts of carbazole.

This reaction mixture can easily be freed from phenanthrene by well known solvents so that a high grade anthracene will be obtained.

*Example 28.*

5 parts of $Al_2O_3$, well mixed with 7 parts $ThO_2$, are suspended in 150 volume parts of an 8% $NaNO_3$ solution. 200 volume parts of pumice stone of pea size are impregnated with this solution and then calcined.

When a mixture of vaporized crude anthracene and air, in the ratio 1-20 by weight, is passed over this stabilized catalyst at 360-400° C., part of the phenanthrene and most of the carbazole and other impurities are destroyed so that the product after one recrystallization from solvent naphtha or acetone is high grade anthracene.

This application is in part a continuation of my co-pending applications Serial Nos. 48,001 and 48,002, filed August 3, 1925 which matured into Patent No. 1,678,626 and No. 1,678,627 respectively, dated July 24, 1928.

What is claimed as new is:

1. A method of oxidizing vaporizable organic compounds, which comprises passing the vapors of the compounds mixed with an oxidizing gas at an elevated temperature over a contact mass which has associated therewith at least one compound of an element falling within the group of alkali metals, alkaline earth metals and earth metals whose oxides are not reducible by hydrogen.

2. A method of oxidizing vaporizable organic compounds, which comprises subjecting them to reaction with an oxidizing agent in the presence of an oxidation contact mass which has associated therewith at least one compound of an element falling within the group of alkali metals, alkaline earth metals and earth metals whose oxides are not reducible by hydrogen and at least one solid, non-specific, vapor phase, chemical catalyst.

3. A method of oxidizing vaporizable organic compounds, which comprises passing the vapors of the compounds mixed with an oxidizing gas at an elevated temperature over an oxidation contact mass which has associated therewith at least one compound of an element falling within the group of alkali metals, alkaline earth metals and earth metals whose oxides are not reducible by hydrogen and at least one solid, non-specific vapor phase, chemical catalyst.

4. A method of oxidizing aliphatic compounds which comprises passing the vapors of the compounds mixed with an oxidizing gas at an elevated temperature over a contact mass which has associated therewith at least one compound of an element falling within the group of alkali metals, alkaline earth metals and earth metals whose oxides are not reducible by hydrogen.

5. A method of oxidizing aliphatic compounds which comprises passing the vapors of the compounds mixed with an oxidizing gas at an elevated temperature over a contact mass which has associated therewith at least one compound of an element falling within the group of alkali metals, alkaline earth metals and earth metals whose oxides are not reducible by hydrogen and at least one solid, non-specific, vapor phase, chemical catalyst.

6. A method of oxidizing an aliphatic alcohol to a carbonyl compound which comprises passing the vapor of the alcohol mixed with an oxidizing gas at an elevated temperature over a contact mass having associated therewith at least one compound of an element falling within the group of alkali metals, alkaline earth metals and earth metals whose oxides are not reducible by hydrogen.

7. A method of oxidizing an aliphatic alcohol to a carbonyl compound which comprises passing the vapor of the alcohol mixed with an oxidizing gas at an elevated temperature over a contact mass having associated therewith at least one compound of an element falling within the group of alkali metals, alkaline earth metals and earth metals whose oxides are not reducible by hydrogen and at least one solid, non-specific, vapor phase, chemical catalyst.

8. A method of oxidizing an aliphatic alcohol to an aldehyde, which comprises passing the vapor of the alcohol mixed with an oxidizing gas at an elevated temperature over a contact mass having associated therewith at least one compound of an element falling within the group of alkali metals, alkaline earth metals and earth metals whose oxides are not reducible by hydrogen in amount sufficient to stop the major portion of the oxidation at the aldehyde stage.

9. A method of oxidizing an aliphatic alcohol to an aldehyde, which comprises passing the vapor of the alcohol mixed with an oxidizing gas at an elevated temperature over a contact mass having associated therewith at least one compound of an element falling within the group of alkali metals, alkaline earth metals and earth metals whose oxides are not reducible by hydrogen in amount sufficient to stop the major portion of the oxidation at the aldehyde stage, the contact mass also having one solid, non-specific, vapor phase, chemical catalyst associated therewith.

10. A method of oxidizing a monohydric paraffin alcohol to the corresponding aldehyde, which comprises passing the vapor of the alcohol admixed with an oxidizing gas at an elevated temperature over a contact mass having associated therewith sufficient compound of an element falling within the group of alkali metals, alkaline earth metals and earth metals whose oxides are not reducible by hydrogen to stop the greater part of the oxidation at the aldehyde stage.

11. A method of oxidizing a monohydric paraffin alcohol to the corresponding aldehyde, which comprises passing the vapor of the alcohol admixed with an oxidizing gas at an elevated temperature over a contact mass having associated therewith sufficient compound of an element falling within the group of alkali metals, alkaline earth metals and earth metals whose oxides are not reducible by hydrogen to stop the greater part of the oxidation at the aldehyde stage, the contact mass also having associated therewith at least one solid, non-specific, vapor phase, chemical catalyst.

12. A method of oxidizing methyl alcohol to formaldehyde, which comprises passing the vapor of methyl alcohol admixed with an oxidizing gas at an elevated temperature over a contact mass having associated therewith sufficient compound of an element falling within the group of alkali metals, alkaline earth metals and earth metals whose oxides are not reducible by hydrogen to prevent a greater part of the oxidation going beyond the aldehyde stage.

13. A method of oxidizing methyl alcohol to formaldehyde, which comprises passing the vapor of methyl alcohol admixed with an oxidizing gas at an elevated temperature over a contact mass having associated therewith sufficient compound of an element falling within the group of alkali metals, alkaline earth metals and earth metals whose oxides are not reducible by hydrogen to prevent a greater part of the oxidation going beyond the aldehyde stage, the contact mass also having associated therewith at least one solid, non-specific, vapor phase, chemical catalyst.

Signed at Pittsburgh, Pennsylvania this 1st day of June 1927.

ALPHONS O. JAEGER.